United States Patent [19]
Strickland, Jr.

[11] Patent Number: 4,614,118
[45] Date of Patent: Sep. 30, 1986

[54] NON-COMPLIANT PRESSURE CELL
[75] Inventor: Gordon E. Strickland, Jr., Yorba Linda, Calif.
[73] Assignee: Chevron Research Company, San Francisco, Calif.
[21] Appl. No.: 700,771
[22] Filed: Feb. 12, 1985
[51] Int. Cl.[4] ............................................. G01L 9/04
[52] U.S. Cl. ...................................... 73/701; 73/705; 73/726
[58] Field of Search ................ 73/701, 862.58, 862.61, 73/784, 722, 728, 705, 720, 721, 726, 727

[56] References Cited
U.S. PATENT DOCUMENTS 3,350,931 11/1967 Johnson et al. ........................ 73/701
3,686,958 8/1972 Porter et al. ........................... 73/705
3,834,239 9/1974 King ....................................... 73/701

Primary Examiner—Donald O. Woodiel
Attorney, Agent, or Firm—S. R. LaPaglia; E. J. Keeling; P. L. McGarrigle

[57] ABSTRACT

The present invention is a pressure sensing and measurement device that eliminates errors due to compliance and lack of sensitivity. The cell uses a pressure receiving means (such as a flexible diaphragm) to detect an impinging object, a means to counteract the pressure caused by the impinging object (such as internal hydraulic pressure), and a detector to measure the amount of internal pressure used to counteract the impinging force. Since the cell is internally pressurized to a point equal to a value equal to the external pressure, the diaphragm is undeflected and may avoid the problems inherent in simple diaphragm systems (such as bridging and insensitivity).

14 Claims, 2 Drawing Figures

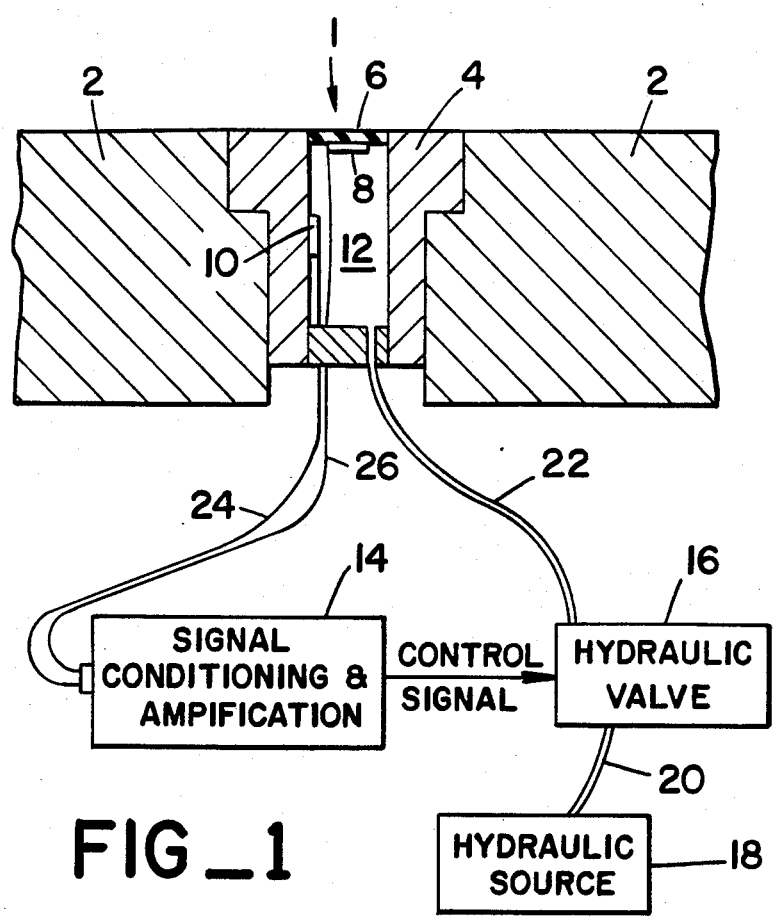
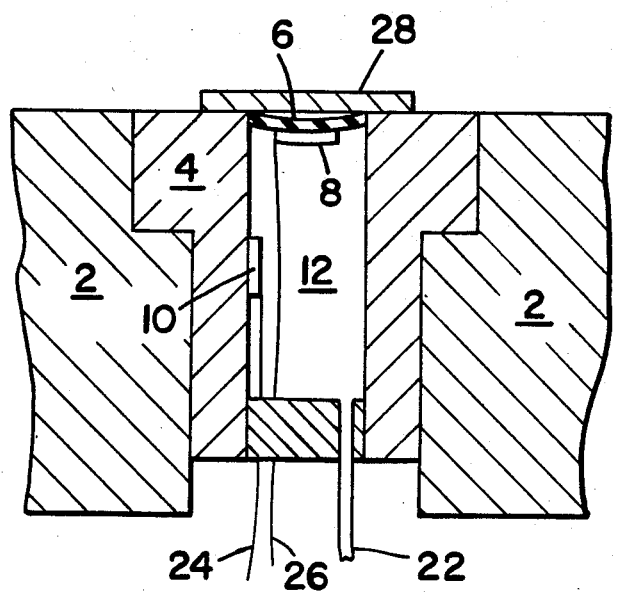

NON-COMPLIANT PRESSURE CELL

FIELD OF INVENTION

This invention relates to pressure sensing devices. Here, the detailed embodiment is a cell for measuring mechanical pressure.

BACKGROUND OF INVENTION

There are several general categories of pressure measuring devices, e.g., those based on the measurement of the height of a liquid column, those based on the deflection of an elastic element, and those that utilize the piezoelectric response of certain crystals.

Pressure measuring devices based on the deflection of an elastic element operate on the principle that, within the elastic range, the magnitude of the deformation is approximately proportional to the applied pressure. Common embodiments are: Bourdon-tube elements, which indicate pressure by the amount of deflection in an arcuate closed-end tube; bellows elements, which axially deform under pressure; and diaphragm elements, which deflect when subjected to a pressure differential between two faces. In each case, pressure will deform the active element in a known way so that as the pressure increases so does the deformation. Once this deflection curve is calibrated, the pressure may be determined.

To determine the deflection of an elastic element, a strain gage which may be bonded to the surface of the element. When an electrical conductor is bonded to an elongating elastic surface, the conductor is stretched. This increases the length, but decreases the diameter of the conductor, which varies the electrical resistance. This change in resistance therefore provides a measure of the deflection of the element. Once calibration has been performed, the amount of pressure applied to the element may be determined directly from the strain gage signals.

These principles of elastic deformation (i.e., in a flexible diaphragm) and electrical resistance have been used to construct pressure cells that measure the amount of force per unit area that is applied by a solid impinging object, such as ice on the hull of a ship, or soil on an imbedded foundation pile. However, these devices may give inaccurate readings for a variety of reasons.

One source of inaccuracy is the presence of softness or compliance in the flexible diaphragm of the pressure cell. The occurrence of what is called bridging is thought to lead to these erroneously low readings. Bridging may be defined as the tendency of the cell compliance to relieve the pressure that the cell experiences, with additional pressure then being applied immediately adjacent to the periphery of the cell. In other words, the solid impinging object is being supported by the sides of the measurement cell and not the pressure sensing face itself (see FIG. 2). The result is that the measured pressure is artificially reduced.

A second source of inaccuracy, even if bridging is not a problem, is insensitivity of the cell. In conventional designs it may be necessary to make the cell diaphragm relatively stiff so that it may have sufficient strength under a maximum expected pressure. However, as the stiffness increases the sensitivity to relatively low pressures decreases because the diaphragm deflections become smaller. This, of course, narrows the operating range of the device.

Consequently, it is an object of this invention to provide a pressure measurement device that may avoid errors due to compliance and also have greater sensitivity.

SUMMARY

The present invention is directed to a pressure cell design which largely avoids errors due to compliance and insensitivity. It includes a rigid cell body having a fluid-tight interior space and an open side on an outward facing surface, a flexible diaphragm covering the open side, and a gage located on the interior surface of the flexible diaphragm. The gage is operably connected to a signal conditioning and amplification unit which is also operably connected to a hydraulic valve. There is also a source of hydraulic fluid (and pressure) that is operably connected to the valve (and then the interior space of the cell) and a device to measure the internal pressure in the hydraulic system.

In order to avoid compliance, the cell is internally pressurized to balance the external pressure that is applied to the cell. The operating sequence of the devices is as follows. Once a solid object impinges on the flexible diaphragm of the cell, the diaphragm deflects due to external pressure. This deflection is monitored by an active element (i.e., a strain gage) that is mounted on the inside of the diaphragm. The strength and the sign of the signal from the strain gage is used to control a hydraulic valve that applies internal pressure to the cell. The hydraulically applied compensating pressure is increased until the flexible diaphragm is in an undeflected position. Once this occurs, the compensating pressure is equal to the externally applied pressure. To determine the external pressure, the internal hydraulic pressure can be measured, since the inside and outside pressure will be equal. This may be done by measuring the pressure at the output side of the control valve, at a tap of the hydraulic line supplying the cell, or with a pressure transducer inside the pressure cell itself.

BRIEF DESCRIPTION OF THE DRAWINGS

FIG. 1 is a schematic view of the invention as put in place; and

FIG. 2 is an illustration of the bridging phenomenon.

DETAILED DESCRIPTION OF THE INVENTION

The present invention is a pressure cell which largely avoids errors from compliance of the flexible diaphragm and from insensitivity. An illustration of the concept is shown by FIG. 1 where the entire pressure cell 1 is bordered and held in place by the wall of a surrounding structure 2. The cell 1 is encased by a cell body 4 and has a flexible diaphragm 6 that is adapted or positioned to receive solid objects (a flat plate may also be used to act in a piston-like fashion). One conceived application of this particular pressure cell 1 is to measure the amount of pressure caused by ice impinging on the hull of an arctic vessel or off-shore structure, or the amount of pressure the surrounding soil may exert on a foundation pile.

The cell 1 has an interior space 12 filled with a hydraulic fluid (however, another adaptation may include a pressurizing medium such as a gas). Within the interior space 12 and located on the diaphragm 6, is a means for monitoring diaphragm deflection 8. Although a strain gage is preferred, other devices may include a linear variable displacement transducer or other displacement detector, or an optical interferometer. Also, assuming that a strain gage is used for monitoring, within the space 12 is a passive or compensating gage 10. This gage 10 is internally mounted on an inactive portion of the cell 1 to improve accuracy. It can provide compensation for any sensitivity of the active gage 8 to hydrostatic pressure and temperature variations within the cell 1. Both the active 8 and the passive gages 10 are connected into an appropriate 'bridge' circuit (i.e., Wheatstone bridge circuit), and to a signal conditioning and amplification device. The active gage 8 is connected to the signal conditioning and amplification unit 14 by a gage leader 26 and the passive gage 10 is connected to the unit 14 by another gage leader 26.

The hydraulic fluid within the interior space 12 is furnished and replenished by a continuously pressurized hydraulic source 18. The hydraulic source 18 is connected to a hydraulic valve 16 by a line 20 and then to the interior space 12 by another line 22.

To avoid compliance of the diaphragm 6 when it encounters a solid object, the interior space 12 of the cell 1 is pressurized to equal the outside pressure. When the pressure in the interior space 12 is equal to the external pressure, the diaphragm 6 returns to a neutral, undeflected position (as shown in FIG. 1). This is initiated when an external object impinges on the diaphragm 6 and begins to deflect it inward. (Even though fluid is a generally incompressible substance the diaphragm 6 will still deflect inward to trigger the feedback mechanism to pressurize the internal space 12. Fluids, even though nearly incompressible, will still compress enough to allow the diaphragm 6 to move and produce a signal.) The signal from each gage 8 and 10 is transmitted to the signal conditioning and amplification unit 14 where the difference between the signals of the active 8 and passive gages 10 are checked. If there is a difference between the two signals then it may be attributed to diaphragm 6 deflection. At this point the resulting signal is amplified and transmitted to the hydraulic valve 16. The hydraulic valve 16 opens and fluid from the continuously pressurized hydraulic source 18 flows through line 20, the valve 16 itself, and line 22 to pressurize the internal space 12. Pressure is applied to the space 12 until the diaphragm 6 is in an undeflected position. Once the diaphragm 6 is in the undeflected position, the pressure on the inside and outside of the cell 1 is equal and the valve 16 is closed.

To determine the pressure acting on the outside face of the diaphragm 6, a measurement may be taken of the final hydraulic pressure on the inside of the cell (after it has been increased). At this point, the internal pressure can be measured at many locations, i.e., at the output side of the control valve 16, at the input of the hydraulic line 22 supplying the cell 1, or with a pressure transducer (29) inside the pressure cell 1 itself. The pressure should be equal at each of these points.

When the outside pressure is suddenly released the cell does not "blow up" due to the internal hydraulic pressure. As mentioned before, hydraulic fluid is almost totally incompressible so the interior space 12 will not expand a great deal (the diaphram 6 would merely "bow out" a small amount). However, it is preferable to compensate for the relaxation of the outside pressure. Here, the strain gage 8 would be able to tell when the diaphragm 6 is deflected inward or outward. When the diaphragm 6 is deflected inward it is because a pressure is acting on the outside surface and that situation has been explained already. When the diaphragm 6 is deflected outward a different signal is sent by the gage 8 through the signal conditioning and amplification unit 14. This signal may be then sent to a bleeder valve (not shown) or may be used to control the hydraulic source 18 and valve 16 to likewise release the pressure within the interior space 12.

In this invention, the flexible diaphragm 6 is no longer used to measure the amount of external pressure impinging on the cell. It is now used as an indicator to tell when the outside and the inside pressures are equal. Consequently, the errors in the flexible diaphragm system are minimized because the effective compliance of the cell is essentially eliminated.

Furthermore, bridging is no longer a problem as the diaphragm does not deflect inward. What occurs with the claimed invention is that an impinging object 28 exerts pressure on the diaphragm face 6 (either directly or by trapping some material) to deflect it (see FIG. 2). The internal pressurization of the cell will keep the diaphragm in contact with the object by compensating for that deflection so that compliance is no longer a problem (diaphragm 6 will be pushed out from the position in FIG. 2).

This cell design also possesses the advantage of increased sensitivity because the diaphragm, which is supported by the compensating hydraulic pressure rather than by its own stiffness, can be very flexible and will therefore accurately respond to a wide range of pressures, including very low values. This compensated response to low pressures will give relatively accurate readings, provided only that the pressure in the hydraulic circuit is measured with an accurate pressure transducer.

In the above description of the operation of the device, for simplicity, the applications of the external and compensating pressures are described as though they occur in large, discrete, and sequential steps. However, it will now be appreciated that the external and compensating pressures build up together in an essentially continuous process involving a series of very many essentially infinitesimal increases in the external pressure and the corresponding compensation.

Since many modifications and variations of the present invention are possible within the spirit of this disclosure, it is intended that the embodiments disclosed are only illustrative and not restrictive, reference being made to the following claims rather than to the specific description to indicate the scope of this invention.

What is claimed is:

1. A device for measuring pressure having a wide range of sensitivity and being free of errors due to compliance, comprising:

a rigid cell body having a fluid-tight interior space and an open side on an outward facing surface, the interior space being filled with a fluid;

a flexible diaphragm located on said outward facing surface of the cell body covering said open side in a fluid-tight relationship;

first gage means for sensing deflection of said flexible diaphragm located on the interior surface of said flexible diaphragm and within said interior space;

signal conditioning and amplification means operably connected to said first gage means for receiving signals from the first gage means to determine if the diaphragm is in a deflected state and to amplify and transmit said signals;

hydraulic valve means operably connected to said signal conditioning and amplification means and in fluid communication with said interior space for receiving signals from the signal conditioning and amplification means to open said valve to allow fluid into the interior space when the diaphragm is deflected and to close said valve when said diaphragm is not deflected;

a continuously pressurized hydraulic source in fluid communication with the hydraulic valve for providing fluid to the interior space through the hydraulic valve; and a means to measure the fluid pressure in the interior space when said diaphragm is in the non-deflected state.

2. The device as recited in claim 1 further including a second gage means located on the interior of said cell body for compensating for the temperature and pressure effects of the interior space on the first gage means.

3. The device as recited in claim 2 where the first and second gage means are strain gages.

4. The device as recited in claim 2 where the first and second gage means are linear variable displacement transducers.

5. A device for measuring pressure having a wide range of sensitivity and being free of errors due to compliance, comprising:

a rigid cell body having a fluid-tight interior space and an open side on an outward facing surface, the interior space being filled with a fluid;

a pressure receiving means located on said outward facing surface of the cell body covering said open side in a fluid-tight relationship;

a first gage means for sensing movement of said pressure receiving means located on the interior surface of said pressure receiving means and within said interior space;

signal conditioning and amplification means operably connected to said first gage means for receiving signals from said first gage means to determine if the pressure receiving means is in a deflected state and to amplify and transmit said signals;

fluid valve means operably connected to said signal conditioning and amplification means and in a fluid communication with said interior space for receiving signals from the signal conditioning and amplification means to open said valve to allow fluid into the interior space when the pressure receiving means is deflected and to close said valve when said pressure receiving means is not deflected;

a fluid source in communication with the fluid valve for providing fluid to the interior space through the valve; and means to measure the fluid pressure in the interior space when said pressure receiving means is in the non-deflected state.

6. The device as recited in claim 5 where the pressure receiving means is a plate.

7. The device as recited in claim 5 where the pressure receiving means if a flexible diaphragm.

8. The device as recited in claim 5 where the fluid for pressurizing the interior space is a gas.

9. The device as recited in claim 5 where the fluid for pressurizing the interior space is a liquid.

10. The device as recited in claim 5 where a second gage means is mounted on the cell body within the interior space.

11. The device as recited in claim 10 where the first and second gage means are strain gages.

12. The device as recited in claim 10 where the first and second gage means are linear variable transducers.

13. A method of measuring the amount of pressure created by a solid impinging object on a pressure measuring device, comprising:

deflecting a movable diaphragm with a solid impinging object, said movable diaphragm located on the surface of a pressure measuring device;

detecting said deflection of a movable diaphragm;

generating a signal to show that the diaphragm has been deflected with a detection source;

amplifying the signal received from said detecting sources;

increasing the internal pressure of said pressure sensing apparatus until said movable diaphragm is undeflected; and measuring the internal pressure of said pressure sensing apparatus.

14. The method as recited in claim 13 further including compensating for internal temperature and pressure while detecting the deflection of said movable diaphragm.

* * * * *